US010830461B2

(12) United States Patent
Xing et al.

(10) Patent No.: US 10,830,461 B2
(45) Date of Patent: Nov. 10, 2020

(54) AIR PURIFICATION DEVICE AND AIR PURIFICATION SYSTEM

(71) Applicant: BEIJING XIAOMI MOBILE SOFTWARE CO., LTD., Beijing (CN)

(72) Inventors: Zheng Xing, Beijing (CN); Lei Zhang, Beijing (CN); Zhenhua Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 219 days.

(21) Appl. No.: 16/042,071

(22) Filed: Jul. 23, 2018

(65) Prior Publication Data
US 2019/0032932 A1 Jan. 31, 2019

(30) Foreign Application Priority Data

Jul. 26, 2017 (CN) .......................... 2017 1 0619500

(51) Int. Cl.
*F24F 3/16* (2006.01)
*A47L 7/04* (2006.01)
(Continued)

(52) U.S. Cl.
CPC .............. *F24F 3/1603* (2013.01); *A47L 7/04* (2013.01); *A47L 9/2805* (2013.01); *A47L 9/2836* (2013.01); *A47L 9/2852* (2013.01); *A47L 9/2873* (2013.01); *A47L 9/2884* (2013.01); *B01D 46/0052* (2013.01); *B01D 46/429* (2013.01); *B01D 46/4245* (2013.01); *B01D 46/4263* (2013.01); *B01D 46/442* (2013.01); *B01D 53/06* (2013.01); *F24F 3/16* (2013.01); *F24F 11/30* (2018.01); *F24F 11/63* (2018.01); *A47L 2201/022* (2013.01);
(Continued)

(58) Field of Classification Search
CPC ............ B01D 46/0052; B01D 46/4245; B01D 46/4263; B01D 46/429; B01D 46/442; B01D 53/06; B01D 2259/4508; B01D 2259/40; Y02B 30/78; A47L 7/04; A47L 9/2805; A47L 9/2836; A47L 9/2852; A47L 9/2873; A47L 9/2884; A47L 2201/022; A47L 2201/04; F24F 11/30; F24F 11/56; F24F 11/63; F24F 2110/50; F24F 2110/2221; F24F 2110/12; F24F 2110/125; F24F 2110/42; F24F 3/16; F24F 3/1603
USPC ...................... 96/116, 150; 55/315, 356, 400
See application file for complete search history.

(56) References Cited

U.S. PATENT DOCUMENTS 5,245,692 A * 9/1993 Kawai .................. F24H 3/0417
165/125
7,837,958 B2 11/2010 Crapser
(Continued)

FOREIGN PATENT DOCUMENTS

GB     2404138 A     1/2005

OTHER PUBLICATIONS

European Search Report in European application No. 18185829.1, dated Nov. 30, 2018.

*Primary Examiner* — Frank M Lawrence, Jr.
(74) *Attorney, Agent, or Firm* — Syncoda LLC; Feng Ma (57) ABSTRACT

An air purification device includes a movement portion configured to move the air purification device to a target region; and a purification portion configured to purify air in the target region to improve air quality of the target region.

19 Claims, 8 Drawing Sheets

(51) Int. Cl.
  *A47L 9/28* (2006.01)
  *F24F 11/63* (2018.01)
  *F24F 11/30* (2018.01)
  *B01D 46/00* (2006.01)
  *B01D 46/42* (2006.01)
  *B01D 46/44* (2006.01)
  *B01D 53/06* (2006.01)
  *F24F 110/50* (2018.01)
  *F24F 11/56* (2018.01)

(52) U.S. Cl.
  CPC ... *A47L 2201/04* (2013.01); *B01D 2259/4508* (2013.01); *B01D 2279/40* (2013.01); *F24F 11/56* (2018.01); *F24F 2110/50* (2018.01); *F24F 2221/12* (2013.01); *F24F 2221/125* (2013.01); *F24F 2221/42* (2013.01); *Y02B 30/70* (2013.01)

(56) References Cited

U.S. PATENT DOCUMENTS

| | | | |
|---|---|---|---|
| 9,429,949 B2 | 8/2016 | Lee | |
| 2003/0028993 A1* | 2/2003 | Song | A47L 9/009 15/319 |
| 2005/0015914 A1 | 1/2005 | You | |
| 2006/0059872 A1* | 3/2006 | Lee | B01D 46/10 55/356 |
| 2006/0137521 A1* | 6/2006 | Sung | B01D 46/003 95/1 |
| 2008/0206092 A1 | 8/2008 | Crapser | |
| 2011/0271839 A1 | 11/2011 | Kim | |
| 2012/0232697 A1 | 9/2012 | Lee | |
| 2016/0278593 A1 | 9/2016 | Lee et al. | |
| 2018/0290104 A1 | 10/2018 | Jong | |

* cited by examiner

AIR PURIFICATION DEVICE AND AIR PURIFICATION SYSTEM

CROSS-REFERENCE TO RELATED APPLICATIONS

This application claims priority to Chinese Patent Application No. 201710619500.7, filed on Jul. 26, 2017, the disclosure of which is hereby incorporated by reference in its entirety.

BACKGROUND

Air purification devices and systems are becoming increasingly popular, particularly in polluted areas or for users with conditions such as asthma. Such devices and systems can be part of indoor decorations, and can have the functions of cleaning contaminated air when flowing from outside into a room or other enclosed environments. The air purification devices and systems can perform sterilization, disinfection, dust reduction, haze removal, and remove harmful chemical and particulate residues from indoor decorations. This can be particularly useful for an enclosed indoor environment, to improve living conditions and office conditions, and promote physical and mental health of occupants.

SUMMARY

The present disclosure generally relates to the technical field of electronics, and more particularly to an air purification device and an air purification system.

The inventors of the present disclosure have recognized that, a purification range of a conventional air purification device is limited, and air purification of different regions may only be performed in a manner of repeatedly moving the air purification device, thereby causing inconvenience for the user to use.

In a first aspect, an air purification device is provided, including: a movement portion configured to move the air purification device to a target region; and a purification portion configured to purify air in the target region to improve air quality of the target region.

In some embodiments, the air purification device further includes: a monitoring portion configured to monitor the air quality to determine the target region, wherein the target region is determined as having an air quality lower than a predetermined standard air quality.

In some embodiments, the monitoring portion includes an infrared sensor configured to measure the air quality.

In some embodiments, the air purification device further includes: a control portion configured to acquire a movement path for the target region to enable the movement portion to drive the air purification device to move according to the movement path.

In some embodiments, the control portion is further configured to receive the movement path sent by an electronic device coupled with the control portion.

In some embodiments, the control portion is configured to automatically generate the movement path.

In some embodiments, the purification portion includes: a recovery portion configured to cause inflow of air; a filter portion configured to filter out pollutants from the air; and a delivery portion configured to deliver filtered air.

In some embodiments, the recovery portion includes a fan.

In some embodiments, the air purification device further includes: a heating portion configured to increase environmental temperature around the air purification device to accelerate release of harmful substances from the environment.

In another aspect, an air purification system is provided, including a charging station, and an air purification device that includes: a movement portion configured to move the air purification device to a target region; a purification portion configured to purify air in the target region to improve air quality of the target region; and a built-in battery configured to power to the air purification device when the air purification device is separated from the charging station, and to couple with the charging station for charging.

In some embodiments, the air purification device further includes: a power level detection portion configured to detect remaining power level of the built-in battery, wherein when the remaining power level of the built-in battery is lower than a predetermined value, the power level detection portion sends an alarm message indicating lower power state of the movement portion, such that the movement portion drives the air purification device to return to the charging station for charging the built-in battery.

In some embodiments, the charging station includes a wireless charging transmitter; the air purification device includes a wireless charging receiver; and the wireless charging transmitter is configured to couple with the wireless charging receiver wirelessly to supply power to the air purification device.

In some embodiments, the charging station includes a power output interface; the air purification device includes a power input interface; and the power output interface is configured to couple with the power input interface to supply power to the air purification device.

In some embodiments, the air purification system further includes a monitoring portion configured to monitor air quality to determine the target region, wherein the air quality of the target region is lower than a predetermined standard air quality.

In some embodiments, the air purification system further includes: a control portion configured to acquire a movement path for the target region to enable the movement portion to drive the air purification device to move according to the movement path.

In some embodiments, the control portion is configured to receive the movement path sent by an electronic device coupled with the control portion.

In some embodiments, the control portion is configured to automatically generate the movement path.

In some embodiments, the air purification system further includes a plurality of air purification devices configured to function collectively to purify air in a space optimally.

In some embodiments, the plurality of air purification devices include at least one of a humidifier, a heater, a vacuum machine, or a wet-cleaning device.

In some embodiments, the plurality air purification devices are configured to automatically generate a plurality of movement paths, and wherein the plurality of movement paths are configured to avoid occupants or to be adjacent to the occupants based on preferences or habits of the occupants. At least one of the plurality of air purification devices is integrated with a floor cleaner configured to vacuum or wet-clean a floor on at least one of the plurality of movement paths. At least one of the plurality of air purification devices can also be integrated with a heater configured to heat up an environment to facilitate accelerated release pollutants from the environment for the air purification portion to absorb.

At least some of the embodiments disclosed herein can have one or more of the following advantages.

For example, the air purification device is provided with the movement portion, so that the air purification device can be controlled to move towards the target region to perform air purification in different target regions. Because of the structural improvements, the air purification device has a broadened air purification range and is easier to use by users. Multitasking of one or a plurality of air purification devices can be achieved, such as air purification, self-moving, floor cleaning, moisturizing, etc.

It should be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Figure 1:
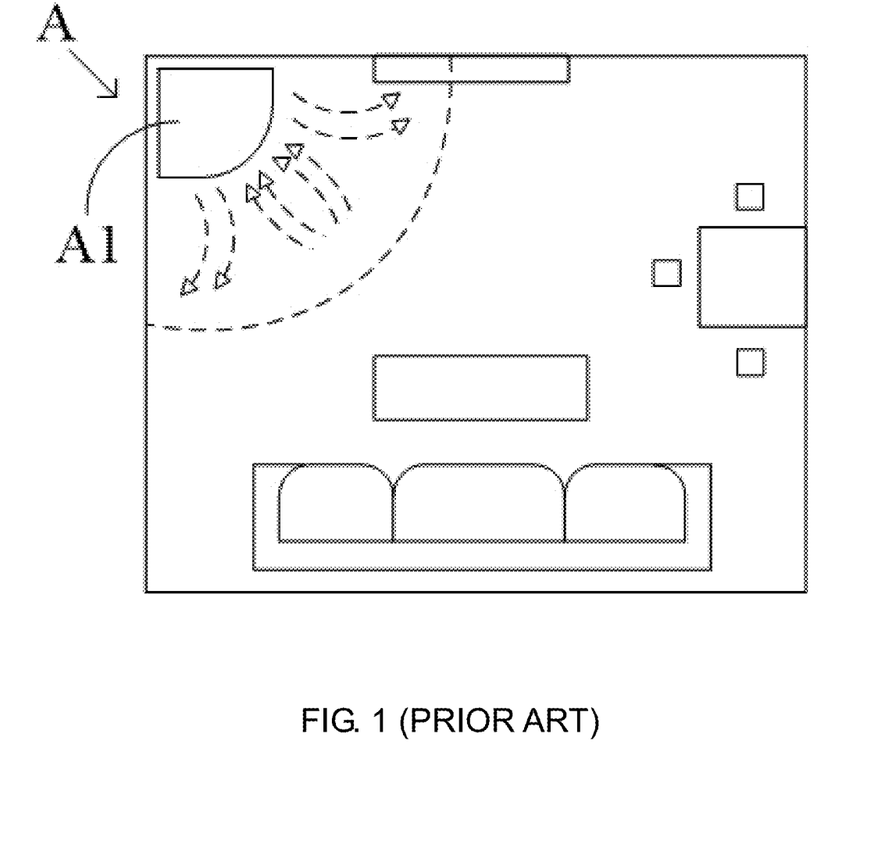
FIG. 1 is a schematic diagram showing a structure of an air purification device according to some existing technologies.

FIG. 1 is a schematic diagram showing a structure of an air purification device in existing technologies. The air purification device A1 shown in FIG. 1 is placed in a corner of a room A and may suck air around it, and then discharge air after purification treatment, so as to improve air quality.

The purification range of the air purification device A1 is indicated by a dashed line in FIG. 1. As shown, the air purification device A1 may not directly improve the air quality of a region outside the purification range, because it is limited by the working efficiency of the air purification device A1. In real life, however, a working space or a living space is typically larger than the purification range of the air purification device A1. To improve air quality of the whole space, the air purification device A1 may have to be repeatedly moved around the whole space, causing inconvenience to the users or maintenance personnel.

To solve one or more problems in existing technologies, an air purification device is provided according to some embodiments of the present disclosure. Structures and functions of such an example air purification device are described in detail below with reference to the drawings.

Figure 2A:
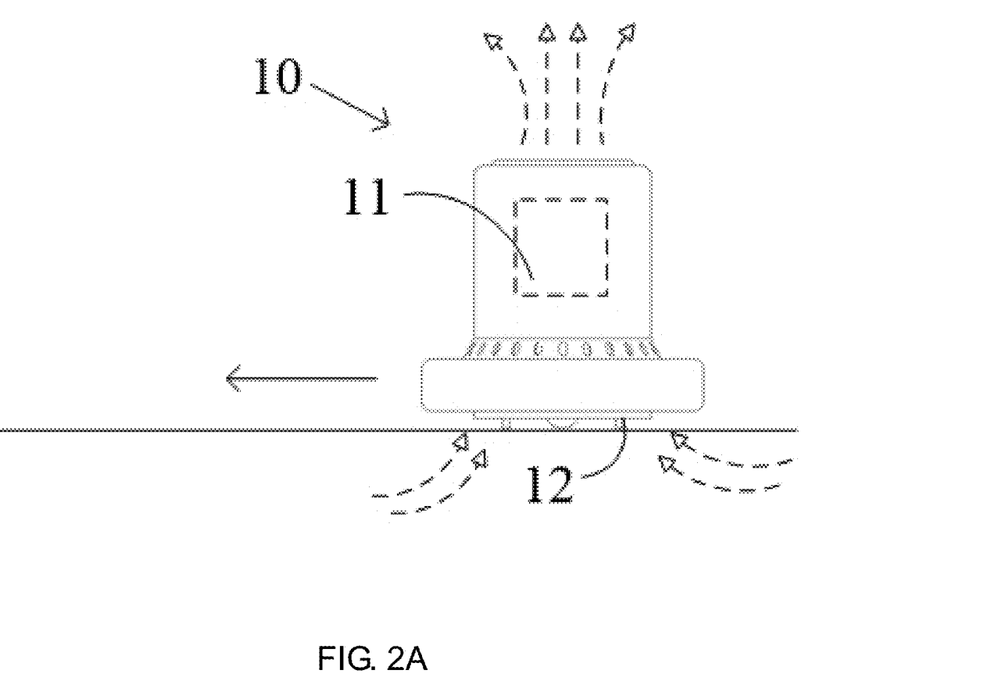
FIG. 2A is a schematic diagram showing an assembled structure of an air purification device according to some embodiments of the present disclosure.

FIG. 2A is a schematic diagram showing an assembled structure of an air purification device 10 according to some embodiments of the present disclosure. The air purification device 10 as illustrated in FIG. 2A may include a movement portion 12 and a purification portion 11.

The various portions 11, 12 according to some embodiments can be implemented in modular configurations and can sometimes be referred to as modules or units. In some other embodiments, however, the various portions can be realized with non-modular components. In some embodiments, although various "portions," "parts," "components," "units," "modules" etc. are referred to for the convenience of description, it is noted that the different "portions," "parts," "components," "units," "modules" can be integrally formed and are not necessarily separate components.

The movement portion 12 is configured to drive the air purification device 10 to move to a target region, and the purification portion 11 may filter out harmful substances from the air in the target region to improve air quality thereof.

The air purification device 10 is provided with the movement portion 12 such that the air purification device 10 may be controlled to move to a number of target regions to perform air purification on different target regions. Therefore, the purification range of the air purification device 10 is significantly expanded, bringing convenience to the users and/or maintenance personnel. For example, the air purification device 10 can autonomously self-drive, or be remotely controlled, and therefore does not need to be moved around manually by the user and/or maintenance personnel.

Figure 2B:
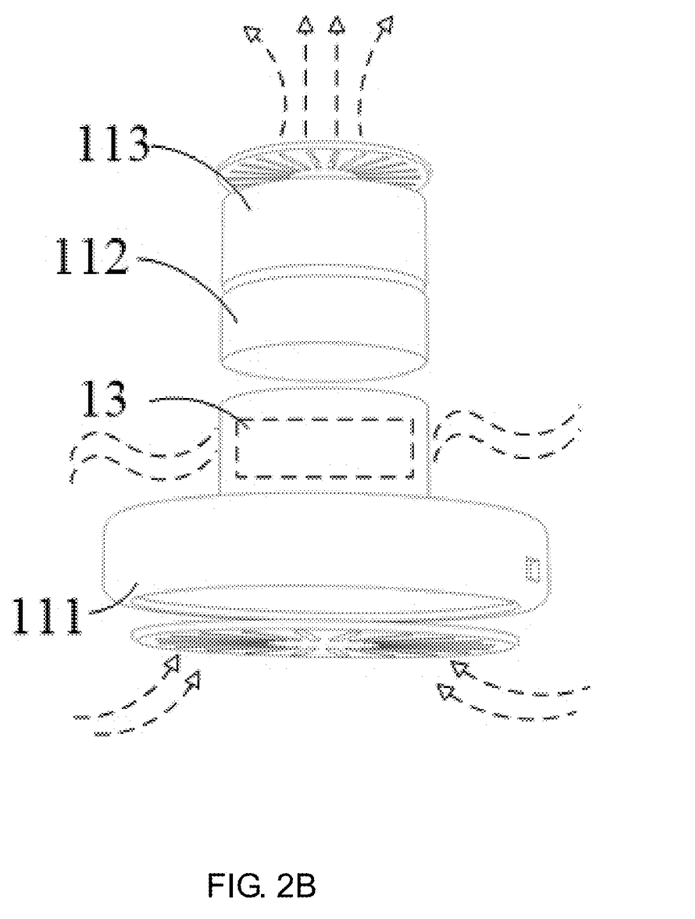
FIG. 2B is an exploded view of an air purification device according to some embodiments of the present disclosure.

In some embodiments, as illustrated in FIG. 2B, the purification portion 11 may include a recovery portion 111, a filter portion 112 and a delivery portion 113. As noted earlier, the different portions can be separate components removably assembled together according to some embodiments, or can be integrally formed together according to some other embodiments.

The recovery portion 111 is configured to cause inflow of air, such as air with non-ideal quality lower than a predefined standard air quality. The sucked air can be delivered through the delivery portion 113 after being filtered by the filter portion 112.

In some embodiments, the recovery portion 111 can include a fan, and rotation of the fan can increase an air inflow volume for the air purification device 10.

In some embodiments, the filter portion 112 can include a filter element with an adsorption function. The filter element can adsorb the harmful substances in the air, such as dust, formaldehyde, or other particulate or non-particulate pollutants. In some embodiments, the filter element comprises a high-efficiency particulate air (HEPA) filter. In some embodiments, the filter element comprises an electrostatic filtration system, an ionic filtration system, or an ozone filtration system, etc. Multiple and different types of filtration systems can be combined to form the filter portion 112 according to some embodiments.

In some embodiments, the air purification device 10 can further include a heating portion 13 configured to increase environmental temperature around the air purification device 10, such that the harmful gases are released quickly from construction materials, new paint, furniture, etc. This is particularly useful in some environment, for example, in a new or newly remodeled home or office, where harmful gases and other pollutants are slowly released. Such pollutants may include, for example, formaldehyde from construction materials. By incorporating heating into the air purification device, the working efficiency and purification effect of the air purification device 10 are improved. Such an operation can be performed, for example, when the environment is absent of occupants, so that the accelerated-release of the pollutants does not harm the occupants.

Figure 3A:
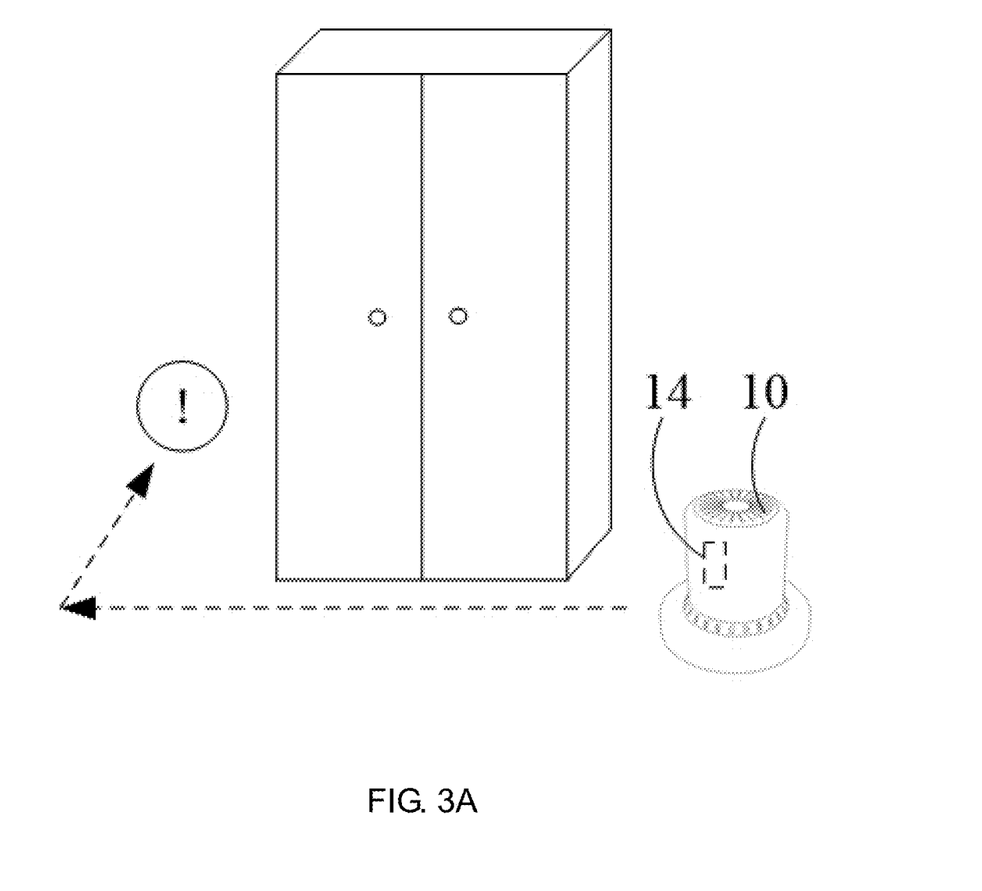
FIG. 3A is a diagram showing an application scenario of an air purification device according to some embodiments of the present disclosure.

In some embodiments, as illustrated in FIG. 3A, the air purification device 10 can be configured to determine the target region(s) to which the air purification device 10 moves, thereby realizing intelligent control over the air purification device 10.

As shown, the air purification device 10 can include a purification portion 11, a movement portion 12 and a monitoring portion 14. The monitoring portion 14 is configured to monitor air quality and determine a region as a target region, where air quality may be lower than a predefined standard air quality.

The movement portion 12 can drive the air purification device 10 to move to the target region, and then the purification portion 11 filters air in the target region to improve the air quality of the target region. The number of target region(s) may be one or more, which is not limited in the present disclosure.

When there are multiple target regions, the target regions may be sequenced, for example according to an order from low to high air quality, such that the air purification device 10 performs air purification on the target regions in preferred sequence. In some embodiments, the monitoring portion 14 can include an infrared gas sensor, or any other types of air quality sensors, to facilitate the determination of the target regions and provide feedback on the purification operations.

Figure 3B:
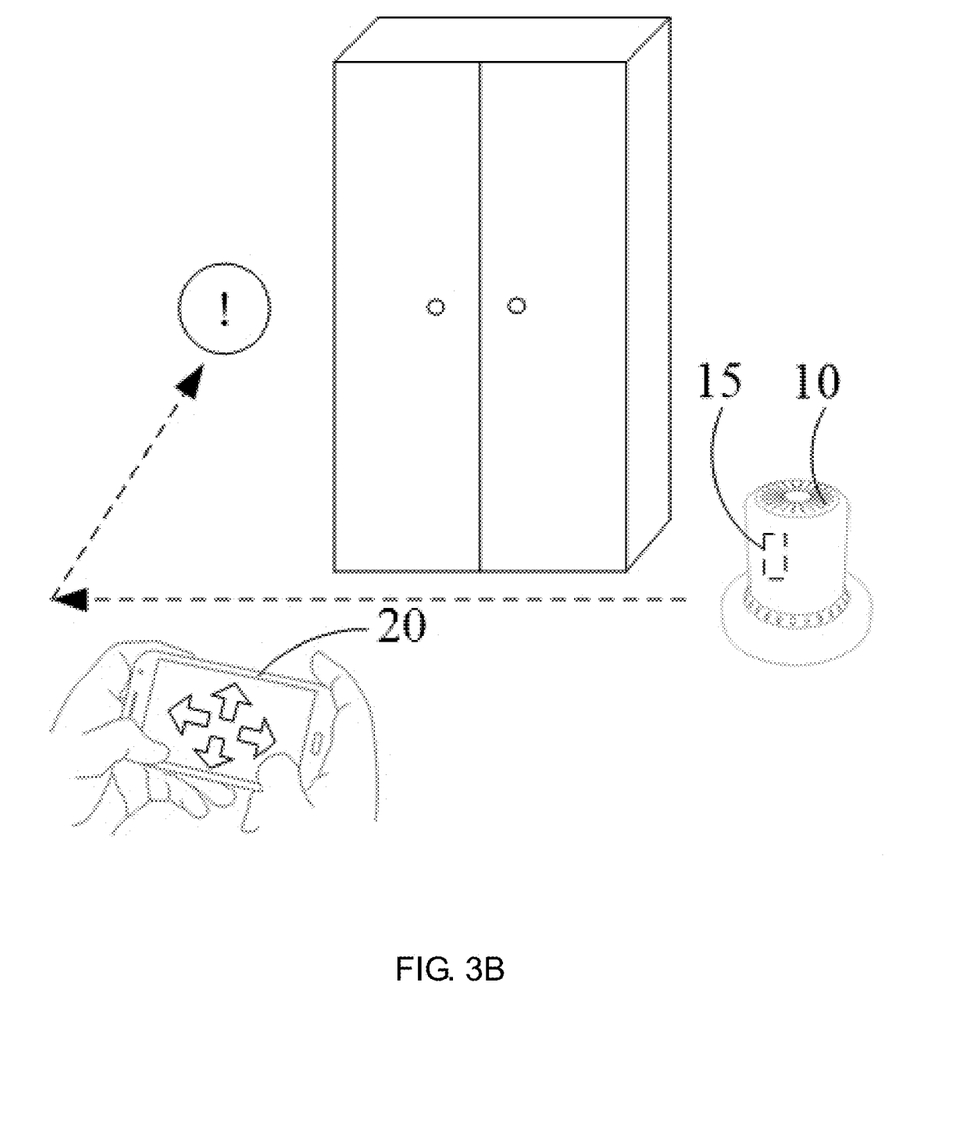
FIG. 3B is a diagram showing an application scenario of an air purification device according to some other embodiments of the present disclosure.

In some embodiments, a movement path may be provided for the air purification device 10 for one or more target regions for optimizing the control. For example, as illustrated in FIG. 3B, an air purification device 10 can include a purification portion 11, a movement portion 12 and a control portion 15. The control portion 15 can acquire a movement path for a target region.

The movement portion 12 can drive the air purification device 10 to move to the target region according to the movement path, such that the purification portion 11 purifies air in the target region to improve air quality of the target region. The movement path may be automatically generated by the control portion 15. Alternatively, the control portion 15 may be coupled with an electronic device such as a mobile phone shown in FIG. 3B and FIG. 3C.

A user can directly control the air purification device 10, for example using a terminal such as the smart mobile phone 20 as shown in FIG. 3B. In some embodiments, the user can set the movement path of the air purification device 10, for example using a terminal such as the smart mobile phone 20 shown in FIG. 3C, and send the movement path to the control portion 15.

Figure 3C:
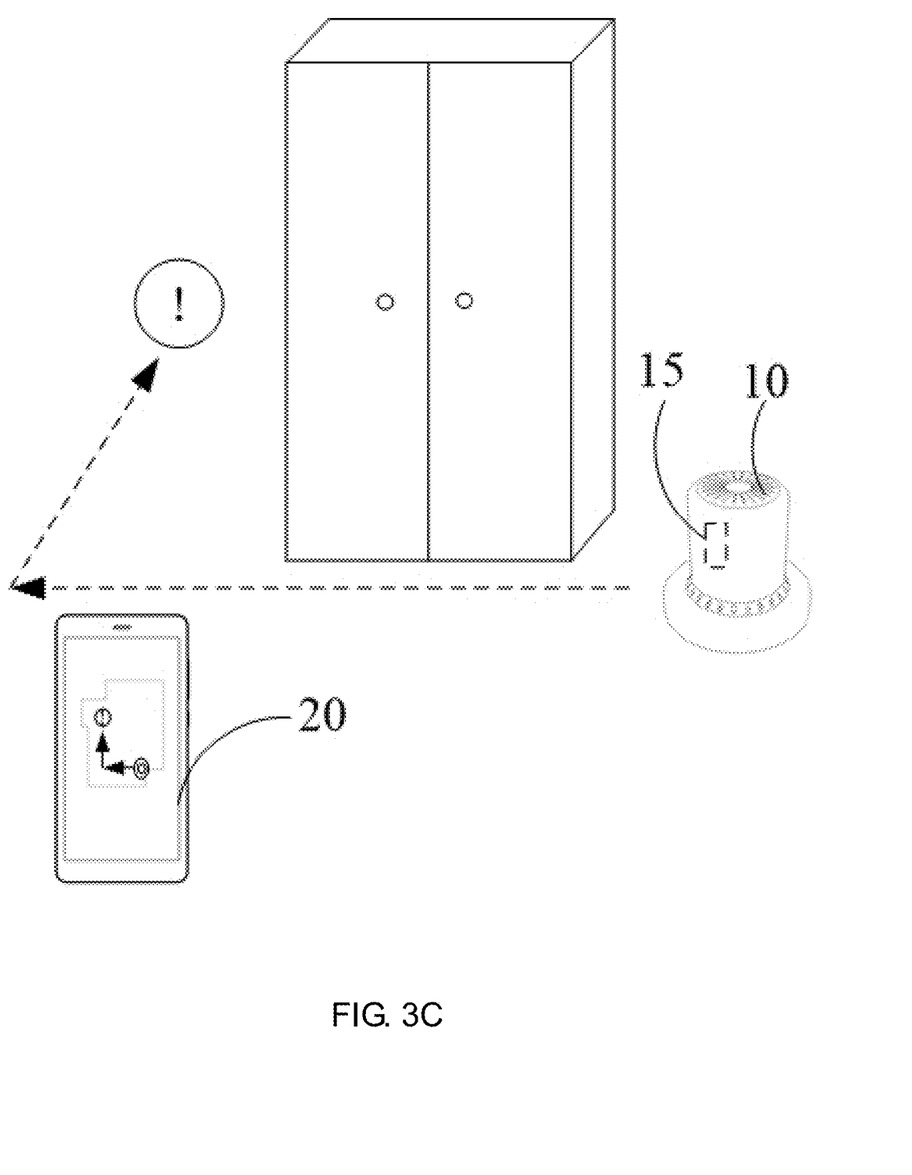
FIG. 3C is a diagram showing an application scenario of an air purification device according to some other embodiments of the present disclosure.

In some embodiments, the movement path automatically generated by the control portion 15, or that controlled or set through the smart mobile phone 20 can be planned according to the air quality of the target region(s). In some other embodiments, the movement path can be planned according to a layout of a space to be monitored, such as the floorplan of the home or office.

The terminal 20 is not limited to a smart mobile phone. Other types of terminals, such as a user-wearable device, a smart watch, a smart TV, a computer, a tablet computer, etc., can also be implemented with the function of controlling or programming the air purification device. In some embodiments, a software or app can be downloaded and installed on the terminal 20 to realize such functions.

Figure 4A:
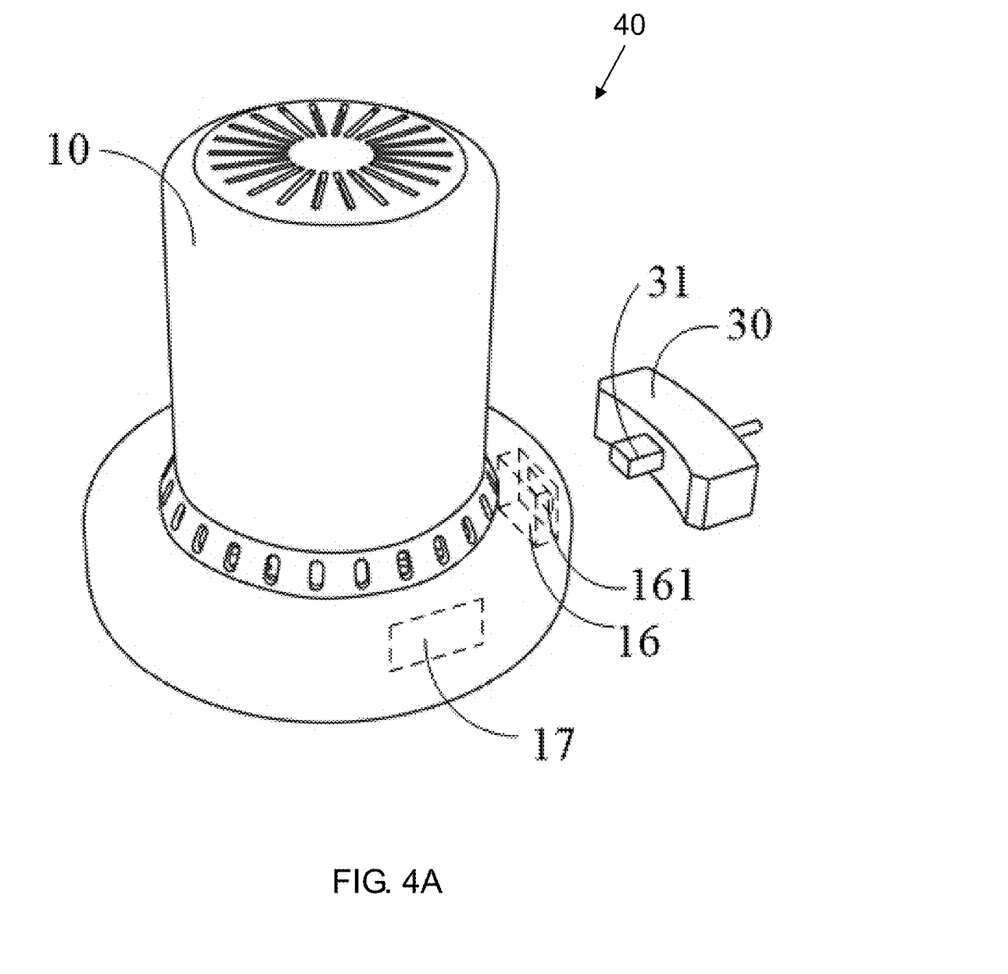
FIG. 4A is a schematic diagram showing a structure of an air purification system according to some embodiments of the present disclosure.

The air purification device 10 including the movement portion 12 can move to the target region(s) for air purification. In some embodiments, an air purification system 40 is provided, as illustrated in FIG. 4A. The air purification system 40 includes a charging station 30, and the air purification device 10 has a built-in battery 16 that can be recharged by the charging station 30. As such, the built-in battery 16 provides the air purification device 10 with a continued power to enable the air purification device 10 to move without wire, until the built-in battery 16 needs to be recharged or replaced.

In some embodiments, the air purification device 10 may be provided with an electric quantity detection portion 17 coupled with the built-in battery 16 to detect remaining power level of the built-in battery 16. When the remaining power level of the built-in battery 16 is lower than a predetermined value (for example, 20% of total power), the electric quantity detection portion 17 may send an alarm message indicating lower power state of the movement portion 12, such that the movement portion 12 can drive the air purification device 10 to return to the charging station 30 for charging of the built-in battery 16 with the charging station 30.

In some embodiments, for a cooperative charging of the built-in battery 16 with the charging pile 30, as illustrated in FIG. 4A, the charging station 30 can be provided with a power output interface 31. Correspondingly, the air purification device 10 can be provided with a power input interface 161. The built-in battery 16 can be charged by coupling the power output interface 31 with the power input interface 161.

Figure 4B:
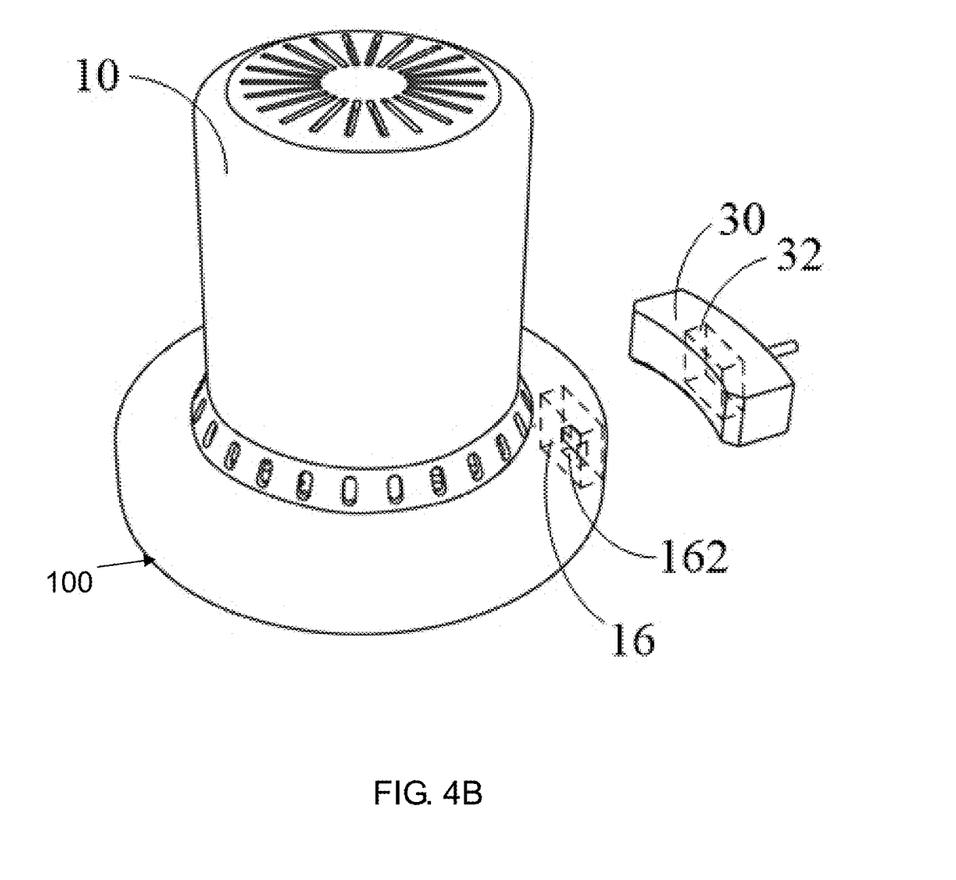
FIG. 4B is a schematic diagram showing a structure of an air purification system according to some other embodiments of the present disclosure.

In some embodiments, as shown in FIG. 4B, the charging station 30 can be provided with a wireless charging transmitter 32, and the air purification device 10 can be provided with a wireless charging receiver 162. The built-in battery 16 can be charged by wireless coupling of the wireless charging transmitter 32 with the wireless charging receiver 162.

In some embodiments, the air purification device 10 is further implemented with floor cleaning functions, for example by including one or more of a vacuum portion, a dust collector, a floor mopping portion functioning with a water/detergent container and spraying portion, etc. Such floor cleaning portions are typically disposed at a lower portion or underneath the movement portion 12, for example, such that the device 10 can also perform cleaning of the floor including vacuuming and wet cleaning. The floor-cleaning operations can be performed concurrently with the air purification operations, or separately, but can take advantage of the movement portion 12 to cover the floorplan of the space to be cleaned.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the air purification device 10 is further implemented with a humidifier, a sterilization portion, a scent spreader, etc., to thereby realize active air quality control. For example, the air purification device 10 can spray water vapor to the air at the target area, making the air filter more effective as water droplets can coalesce with particulate pollutants. In another example, the air purification device 10 can irradiate a target region with UV light, to sterilize the air or a surface in the target region.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

When instructions stored in the storage medium are executed by a processor of the terminal 20, or an onboard processing circuit of the air purification device 10, the air purification device 10 can perform various cleaning operations such as those described above. For example, as illustrated in FIG. 4B, at least one of the plurality of air purification devices 10 can be integrated with a floor cleaner 100 configured to vacuum or wet-clean a floor on at least one of the plurality of movement paths. The instructions can include purifying the air with the purification portion 11 while driving the air purification device 10 along one of the movement paths, start cleaning the floor with the floor cleaner 100 when dirt is detected on the floor or if so desired by the user, all the while continuing purifying the air; stop cleaning the floor when it is spot cleaned, and continue purifying the air while driving the air purification device 10 along the movement path.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The smart control terminal 20 may be a terminal or part of a terminal, which may include all kinds of apparatus, devices, and machines for processing data, including, by way of example, a programmable processor, a computer, a system on a chip, or multiple ones, or combinations of the foregoing.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the air purification device 10 can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the air purification device 10, to direct the air purification device 10 to move to desired target areas, or to perform desired operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

In the case of a relative large area, a hotel, or an office, the air purification system 40 can include one or more robotic air purification devices 10 can be integrally implemented in the system to clean the home, hotel or the office, based on users' location, movement, preference, habits, etc. The plurality of air purification devices 10 can communicate (e.g., "talk") to each other to coordinate movement paths, cleaning operations, charging operations, etc., thereby forming a highly autonomous air purification system to thereby realize optimal air purification and cleaning of the area as desired by the user.

For example, in some embodiments the movement path of the air purification device(s) can be configured to avoid the occupants in the case that the occupants do not wish to be disturbed, or to be adjacent to the occupants if the occupants wish to recent a burst of fresh air or the scent from the scent spreader onboard the air purification device 10.

In some embodiments, a touch screen (not shown) is included on the air purification device allowing user input to control the air purification device 10 directly.

In some embodiments, the air purification system 40 includes a plurality of air purification devices 10 communicatively forming a self-organizing system configured to perform optimal air purification and/or cleaning operations. In some embodiments, not all of the air purification devices 10 in the air purification system 40. Rather, one or more of the plurality of air purification devices 10 may be disposed at desired locations, such as central locations, without the movement portion 12.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An air purification device, comprising:
   a movement portion configured to move the air purification device to a target region; and
   a purification portion configured to purify air in the target region to improve air quality of the target region;
   a heating portion configured to increase environmental temperature around the air purification device to accelerate release of harmful substances from the environment.

2. The air purification device according to claim 1, further comprising:
   a monitoring portion configured to monitor the air quality to determine the target region, wherein the target region is determined as having an air quality lower than a predetermined standard air quality.

3. The air purification device according to claim 2, wherein the monitoring portion comprises an infrared sensor configured to measure the air quality.

4. The air purification device according to claim 1, further comprising:
   a control portion configured to acquire a movement path for the target region to enable the movement portion to drive the air purification device to move according to the movement path.

5. The air purification device according to claim 4, wherein the control portion is further configured to receive the movement path sent by an electronic device coupled with the control portion.

6. The air purification device according to claim 4, wherein the control portion is configured to automatically generate the movement path.

7. The air purification device according to claim 1, wherein the purification portion comprises:
   a recovery portion configured to cause inflow of air;
   a filter portion configured to filter out pollutants from the air; and
   a delivery portion configured to deliver filtered air.

8. The air purification device according to claim 7, wherein the recovery portion comprises a fan.

9. An air purification system, comprising a charging station, and an air purification device that includes:
   a movement portion configured to move the air purification device to a target region;
   a purification portion configured to purify air in the target region to improve air quality of the target region; and
   a built-in battery configured to power to the air purification device when the air purification device is separated from the charging station, and to couple with the charging station for charging,
   wherein the air purification device is integrated with a heater configured to heat up an environment to facilitate accelerated release pollutants from the environment for the purification portion to absorb.

10. The air purification system according to claim 9, wherein the air purification device further comprises:

a power level detection portion configured to detect remaining power level of the built-in battery, wherein when the remaining power level of the built-in battery is lower than a predetermined value, the power level detection portion sends an alarm message indicating lower power state of the movement portion, such that the movement portion drives the air purification device to return to the charging station for charging the built-in battery.

11. The air purification system according to claim 9, wherein:
the charging station comprises a wireless charging transmitter;
the air purification device comprises a wireless charging receiver; and
the wireless charging transmitter is configured to couple with the wireless charging receiver wirelessly to supply power to the air purification device.

12. The air purification system according to claim 9, wherein:
the charging station comprises a power output interface;
the air purification device comprises a power input interface; and
the power output interface is configured to couple with the power input interface to supply power to the air purification device.

13. The air purification system according to claim 9, further comprising:
a monitoring portion configured to monitor air quality to determine the target region, wherein the air quality of the target region is lower than a predetermined standard air quality.

14. The air purification system according to claim 9, further comprising:
a control portion configured to acquire a movement path for the target region to enable the movement portion to drive the air purification device to move according to the movement path.

15. The air purification system according to claim 14, wherein the control portion is configured to receive the movement path sent by an electronic device coupled with the control portion.

16. The air purification system according to claim 14, wherein the control portion is configured to automatically generate the movement path.

17. The air purification system according to claim 16, further comprising a plurality of air purification devices configured to function collectively to purify air in a space optimally.

18. The air purification system according to claim 17, wherein the plurality of air purification devices include at least one of a humidifier, a vacuum machine, or a wet-cleaning device.

19. The air purification system according to claim 18, wherein:
the plurality air purification devices are configured to automatically generate a plurality of movement paths;
the plurality of movement paths are configured to avoid occupants or to be adjacent to the occupants based on preferences or habits of the occupants; and
at least one of the plurality of air purification devices is integrated with a floor cleaner configured to vacuum or wet-clean a floor on at least one of the plurality of movement paths.

* * * * *